United States Patent [19]

Stackhouse et al.

[11] 4,427,740

[45] Jan. 24, 1984

[54] HIGH MAXIMUM SERVICE TEMPERATURE LOW CURE TEMPERATURE NON-LINEAR ELECTRICAL GRADING COATINGS RESISTANT TO V.P.I. RESINS CONTAINING HIGHLY REACTIVE COMPONENTS

[75] Inventors: Donald F. Stackhouse, Georgetown; Ut V. Pham, Round Rock, both of Tex.

[73] Assignee: Westinghouse Electric Corp., Pittsburgh, Pa.

[21] Appl. No.: 367,191

[22] Filed: Apr. 9, 1982

[51] Int. Cl.³ .................. B32B 5/16; B05D 1/12; H02K 15/00

[52] U.S. Cl. .................. 428/324; 29/596; 29/598; 310/45; 427/104; 427/116; 428/363; 428/383

[58] Field of Search ........ 310/45; 29/596, 598; 428/324, 363, 383; 264/137, 272.2, 272.19; 427/104, 116

[56] References Cited

U.S. PATENT DOCUMENTS

| | | | |
|---|---|---|---|
| 3,066,180 | 11/1962 | Virsberg et al. | 174/127 |
| 3,210,461 | 10/1965 | Berg et al. | 174/127 |
| 3,823,334 | 7/1974 | Philofsky et al. | 310/196 |
| 3,991,232 | 11/1976 | Kamiuchi et al. | 264/272.19 |
| 4,224,541 | 9/1980 | Smith et al. | 427/116 |
| 4,296,018 | 10/1981 | Smith et al. | 428/363 |
| 4,336,302 | 6/1982 | Ihlen | 428/363 |
| 4,381,327 | 4/1983 | Briere | 428/324 |

OTHER PUBLICATIONS

Stock, A. J., "Conductive Coatings Compared" 1971, *EDN Bulletin*, Cahners Publications, May 1, 1971, pp. 1–5.

*Primary Examiner*—William R. Dixon, Jr.
*Attorney, Agent, or Firm*—D. P. Cillo

[57] ABSTRACT

An insulated electrical member adapted for high voltage use is made by (1) covering a conducting member having a porous layer disposed thereon with a non-linear stress grading composition comprising cycloaliphatic epoxy resin, non-linear silicon carbide and an effective amount of curing agent, (2) curing the non-linear stress grading composition at up to about 130° C., (3) impregnating the porous layer with a reactive insulating resin composition containing polar components, such that the resin composition contacts the non-linear stress grading composition, and (4) heating the covered, impregnated electrical member to cure the insulating resin composition, where the non-linear stress grading composition after insulating resin cure is characterized as remaining adherent to the member.

12 Claims, 4 Drawing Figures

HIGH MAXIMUM SERVICE TEMPERATURE LOW CURE TEMPERATURE NON-LINEAR ELECTRICAL GRADING COATINGS RESISTANT TO V.P.I. RESINS CONTAINING HIGHLY REACTIVE COMPONENTS

BACKGROUND OF THE INVENTION

In order to operate rotating electrical machinery, such as motors and generators, at voltages in excess of an approximate 6 KV., AC., rating, it is necessary to prevent slot discharges from occurring between the outside of the coil insulation and the iron core laminations. Otherwise, corona damage will progressively erode the ground wall coil insulation. It is customary to help solve this problem by applying a linear, conducting, carbon black filled paint or tape layer on the outside of the mica tape or mica paper insulated coil at the slot portion of the coil. To prevent corona at the ends of the slots, a much higher resistivity, non-linear stress grading paint or tape layer is applied, with sufficient overlap of the end portion of the linear slot coating, to provide good electrical contact, as developed in the late 1950's by Virsberg et al., U.S. Pat. No. 3,066,180.

Virsberg et al. utilized a brushable, shrinkable paint composition, consisting of a base varnish of either oil-modified alkyd resin, polyurethane resin, or standard epoxy resin, incorporating from 10 wt. % to 65 wt. % of high-resistivity silicon carbide particles. The epoxy resins were of the glycidyl ether bisphenol A, bisphenol F, or novolac types, made with phenol and epichlorohydrin, which could be modified by addition of acidic polyesters. These coatings were applied, as a paint or coated tape, to in-place, cured, coil insulation systems, of up to about a 16 KV. rating, and then heated at up to about 60° C., for about 6 hours, to cure the coating. The use of standard epoxy resins in the composition could, however, present tracking problems at higher KV. ratings.

In the early 1960's, other non-linear stress grading systems were taught by Berg et al., in U.S. Pat. No. 3,210,461, where the paint consisted of 6 parts by weight of SiC containing from 0.5 wt. % to 4 wt. % carbon, 1 part by weight of chlorofluorocarbon resin, and 4 parts by weight toluene. These coatings were also applied, as a paint, to in-place, cured, coil insulation systems of up to about a 20 KV. rating, and then heated to cure the coating. This non-linear grading paint solved corona problems for systems up to about a 20 KV. rating, but the resin was very expensive and not readily available, and it provided somewhat brittle coatings.

For higher KV. rated systems, a complicated system of precisely positioned polyester or epoxy resin strips, containing powdered barium titanate, have been embedded within the coil insulation at the ends of the slots, as taught by Philofsky et al., in U.S. Pat. No. 3,823,334. These high dielectric strips are arranged so that predetermined intermediate voltage belts control the electric field within the insulation, and the surface stress does not reach too large a value. This system requires a high measure of quality control.

Recently, rather than first insulating the mica tape or mica paper wrapped coils with, for example an anhydride cured epoxy resin system, followed by curing the insulating resin, then applying and curing stress coatings, and then finally inserting the coils into stator slots; post-impregnation insulating processes have been developed. In the post-impregnation insulating process, after the conducting tape layer and semi-conducting grading paint layer have been applied to mica tape or mica paper wrapped coils, the coils inserted into stator slots, and the motor or other electrical apparatus low temperature prebaked at about 115° C. for 2 hours; the entire apparatus is then placed in a large tank, and insulated with a reactive impregnating resin composition by a vacuum pressure impregnation process (V.P.I.). The V.P.I. resin composition is then baked at 150° C. to 180° C. to cure. This post-impregnation and hot baking with the grading paint already in-place, created a host of new problems.

During the prebake operation, the temperature must be kept below about 130° C., or harm will be caused to other insulating materials, mica tape backing and some tying materials used in the assembled electrical apparatus. High prebake temperatures may also cure the small amount of catalyzed resin bond in the mica tape or mica paper, and interfere with subsequent resin impregnation. However, at prebake temperatures below about 130° C., most resins heretofore used to bind the SiC in the semiconducting grading paint are not completely cured, unless extended time periods are used.

Subsequent contact with reactive, diluted, catalyzed, V.P.I. resins, particularly epoxy-acid anhydride V.P.I. insulating resin compositions, especially during V.P.I. resin cure at 150° C. to 180° C., can cause degradation of the semi-conducting grading composition. It is thought, that the highly polar resins of the grading composition can be chemically attacked by the combination of highly polar reactive diluent and acid anhydride in the reactive V.P.I. resin composition, which can cause blistering, flaking, and other very serious deleterious electrical changes. The term "highly polar insulating resin" is herein defined to mean V.P.I. resins containing reactive diluents and/or acid anhydrides.

As shown by A. J. Stock, in *1971 EDN Bulletin*, Cahners Publication, "Conductive Coatings Compared", May 1, 1971, pp. 1–5, most common phenolic, epoxy and silicone resins, while having high maximum service temperatures, also have 1 hour cure temperatures of over about 150° C. Alkyd resins, while having lower 1 hour cure temperatures, are generally shown to also have lower maximum service temperatures.

What is needed is a SiC-resin grading system that will have a high maximum service temperature, and will both cure at a temperature of up to 130° C., preferably within a 2½ hour span, and will also be completely resistant in the cured state to chemical attack by contacting, reactive V.P.I. resin compositions containing catalysts, acid components such as acid anhydride curing agents, reactive diluents and the like, at room temperature, and also at V.P.I. resin cure temperatures of up to 180° C. The non-linear grading composition must also be simple, inexpensive, arc-track resistant, flexible so as to resist cracking due to vibration, and compatible with mica and SiC and other components of the electrical apparatus, and have an adequate shelf life so that it is commercially useful. This Si-C grading coating is needed for systems where the insulation resin is not applied and cured before Si-C grading coating application.

SUMMARY OF THE INVENTION

The above-mentioned problems have been solved, and the above needs met, by providing a high resistivity, non-linear stress grading composition, consisting essentially of: 100 parts by weight of a cycloaliphatic epoxy resin, preferably an admixture of 70 to 100 parts of solid cycloaliphatic epoxy and 0 to 30 parts of liquid cycloaliphatic epoxy; an effective amount of curing agent, preferably up to about 15 parts by weight of a Lewis acid complex, preferably a boron trichloride amine complex; non-linear silicon carbide powder, preferably over about 200 parts by weight; and an effective amount of organic solvent, usually from about 100 to about 400 parts by weight, such as xylene and/or ethyl Cellosolve.

This non-linear stress grading composition is based upon a solid cycloaliphatic resin, preferably combined with a Lewis acid complex as a curing agent, which gives an unusual combination of both long room temperature shelf life and high temperature stability, together with rapid and complete cure at from 115° C. to about 130° C., and chemical resistance, at room temperature and at over about 130° C., more usually at up to 180° C., to contacting admixtures of acid anhydride curing agents, and reactive diluents used in low viscosity, reactive V.P.I. epoxy resin compositions. This non-linear stress grading composition remains adherent, with no substantial degradation by the reactive resin, and is also semi-flexible, compatible with mica, has good shelf life, and is arc-track and corona resistant for systems up to at least a 20 KV. rating.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 1:
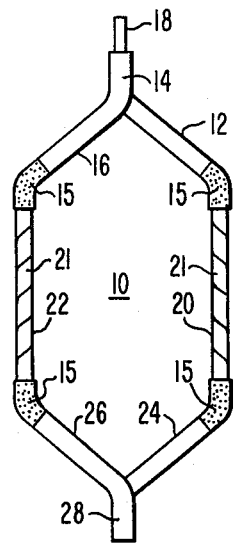
FIG. 1 is a plan view of a closed full electrical coil member having two slot portions.

The only types of epoxy resins that are useful in the high maximum service temperature, low cure temperature, non-linear, electrical stress grading compositions of this invention are cycloaliphatic epoxy resins. These types of resins are highly specialized, and were generally commercially introduced in the 1960's. They are non-glycidyl ethers generally made by reacting olefins with peracids. The common biphenol A epoxies, bisphenol F epoxies, and novolac epoxies, do not provide the adequate track resistance required in the stress coatings of this invention, and are excluded from the non-linear stress grading compositions of this invention.

Examples of useful solid cycloaliphatic epoxy resins would include dicyclopentadiene dioxide (Union Carbide EP-207); and a 3,4-epoxycyclohexyl-3,4-epoxycyclohexane type epoxy, containing at least two epoxide groups which are part of ring structures (Union Carbide ERRA-4211), having respective structures similar to the following:

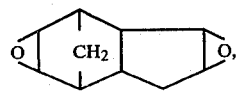

and idealized

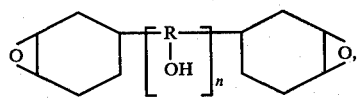

and the like. Examples of liquid cycloaliphatic epoxy resins would include 3,4-epoxycyclohexylmethyl-3,4-epoxycyclohexane carboxylate (Union Carbide ERL-4221); vinyl cyclohexene dioxide (Union Carbide ERL-4206); and 3,4-epoxy-6-methylcyclohexyl methyl-3,4-epoxy-6-methylcyclohexane carboxylate (Union Carbide ERL-4201), having the following respective structures:

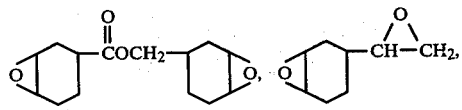

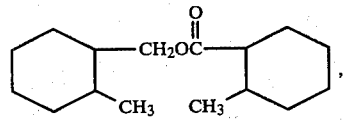

and the like, where all of the cycloaliphatic resins described herein above are meant to be illustrative and not limiting. Cycloaliphatic epoxy resins are well known in the art and reference may be made to J. A. Brydson, *Plastic Materials,* D. Van Nostrand Co., 1966, Ch. 22.4 for additional discussion.

Although the resin component of the stress grading composition can consist of 100% solid cycloaliphatic resin, the preferred range is an admixture of from 70 to 100 parts solid cycloaliphatic epoxy resin with 0 to 30 parts liquid cycloaliphatic epoxy resin. Use of liquid resin over this range will adversely affect the adherence of the non-linear stress grading composition to the electrical coil. In some instances, liquid cycloaliphatic epoxy resins can be reacted with curing agents to form "B staged" solid cycloaliphatic epoxy resins, i.e., solidified but not completely cured to an infusible material. The term "solid cycloaliphatic epoxy resins" is meant to include such B staged liquid resins. In these B staged resins, the curing agent becomes part of the resin structure.

Lewis acid complexes (blocked Lewis acids), are preferred as curing agents for the cycloaliphatic epoxy resins in the non-linear stress grading composition of this invention. The blocked Lewis acid is a compound which reacts sluggishly at room temperature, allowing extended shelf life to compositions that utilize it. Such curing agents usually involve complexing a Lewis acid with an amine. Common, useful curing agents of this type include boron trichloride-amine complexes; boron trifluoride monoethylamine; boron trifluoride piperidine, and the like. Boron trichloride-amine complexes are preferred. These Lewis acid complexes are well known in the art and are described in detail by Lee and Neville, *Handbook of Epoxy Resins,* McGraw-Hill Co., 1967, pp. 11-2 to 11-8. The Lewis acid complex is added, preferably in the range of from 2 parts to about 15 parts by weight for each 100 parts of cycloaliphatic epoxy resin, and most preferably from 3 parts to about 15 parts by weight for each 100 parts of cycloaliphatic epoxy. Less than 2 parts, cure is slow but may be adequate. Over 15 parts, shelf life of the composition is drastically reduced.

In order to possess the required non-linear resistive properties, the stress grading composition of this invention must be loaded with generally contacting non-linear silicon carbide particles. These silicon carbide particles have non-linear electrical resistivity properties and have an average particle size of between about 1 and 150 microns (up to about 100 U.S. Sieve Mesh), preferably between about 5 and 100 microns. In the silicon carbide composition or paint, the weight ratio of cycloaliphatic epoxy resin:SiC particles is from 1:2 to 1:8 preferably from 1:2.5 to 1:4. Above 1:8, the paint will not spread evenly, below 1:2 there is not enough SiC contact. This paint is usually applied in a toluene, vinyltoluene, xylene or other similar type solvent medium.

In order to possess the desired non-linear resistivity properties, i.e., resistivity varying with voltage, the silicon carbide must contain small amounts, i.e., up to about 5 wt. % of doping materials such as aluminum or phosphorous. Such SiC materials are well known in the art and are commercially available, for example, as Carbotronic GG silicon carbide from the Excelon Corporation, and as electrical grade from the Norton Company. In these materials, when the trivalent aluminum atom occupies the location of the tetravalent silicon in the silicon carbide lattice, the mixing electron causes the material to become p-conducting.

At very low currents (up to $10^{-9}$ amp. per particle-to-particle contact point) the current is proportional with the voltage. At increasing currents, the resistance of silicon carbide powder becomes increasingly non-linear, and at currents between $10^{-4}$ and $10^{-3}$ amp per contact point, the current I, will follow the equation $I = K \cdot V^n$, where V is voltage and n is a number between 2 and 7. This non-linearity of the silicon carbide powder may be easily determined by measuring voltage at various currents in a cylindrical column having a diameter of one inch, where the powder is placed in the column between electrodes at a pressure of 400 psi. For satisfactory non-linear stress-grading contacts, n in the formula above, should be between 2 and 7 and preferably about 5.

The typical commercial grade of silicon carbide possesses such doping impurities and the other desired properties, and the term "non-linear silicon carbide" particles is here taken to mean such materials. These materials provide a silicon carbide stress grading coating composition which is a non-linear and self-adjusting voltage divider. In addition, very minor amounts of solid pigments may be added if required.

From about 100 to about 400 parts by weight organic solvent is used for each 100 parts of cycloaliphatic epoxy resin. This is an amount effective to provide a suitably thick, flowable, semi-solid composition of the proper viscosity. Useful solvents include xylene, ethyl Cellosolve (ethylene glycol monoethyl ether), butyl Cellosolve (ethylene glycol monobutyl ether), toluene, vinyltoluene, methyl ethyl ketone, and the like, and mixtures thereof. The shelf life of these non-linear stress grading compositions will be in excess of 3 months at 25° C. After a drying operation, the composition usually has a waxy, soft solid consistency, with a shelf life of about 1 month. After prebaking, it becomes a cured, semi-flexible solid material, i.e., the resin is flexible but the Si-C loading makes it somewhat stiff, although not brittle.

Referring now to the Drawings, a closed full coil 10 prepared in accordance with the present invention, for insertion into an insulated high voltage electrical machine, such as an insulated high voltage electric motor, is illustrated in FIG. 1. The full coil would be disposed within the slots of the stator surrounding the metal motor armature. The full coil comprises an end portion comprising a tangent 12, a connecting loop 14 and another tangent 16 with bare leads 18 extending therefrom. Slot portions 20 and 22 of the coil, which may sometimes be hot pressed to form them to predetermined shape and size, are connected to the tangents 12 and 16, respectively. These slot portions are connected to other tangents 24 and 26 connected through another loop 28.

Conducting tape 21 is shown wrapped around the slot portions of the coil. The tape consists of glass cloth, polyethylene terephthalate (Dacron), or other suitable fibrous material, coated with a conducting varnish, to provide a linear slot coating. The conducting varnish can comprise, for example, a vinyl toluene modified-alkyd base resin or a phenolic resin or a phenolic-alkyd resin, and the like, loaded with about 35 wt. % to 80 wt. % of conducting particles, such as carbon, and the like. In some instances the fibrous material can be eliminated and the varnish applied directly to the bonding tape covering the mica tape or mica paper insulated coil. The low cure non-linear electrical grading coating of this invention is shown as 15.

The coils are placed in the slots of the stator of an electrical machine and the end windings may be tied together. The uninsulated leads are then soldered, brazed, welded or otherwise connected and insulated. The electrical machine is then placed in an oven and low temperature prebaked at from 110° C. to about 130° C. preferably from 1 to about 2½ hours, to cure as much as possible the conducting varnish and the non-linear electrical grading coating, and to remove moisture and other volatiles from the machine.

In the case of a motor, generally the entire motor containing the coils will then be placed in an impregnating tank and vacuum and pressure treated with impregnating resin. Thereafter the impregnated motor is removed from the impregnating tank, drained, placed in an oven and heated to a temperature to cure the completely reactive composition in the coils.

In the vacuum pressure impregnation process, the motor containing the coils is placed in a dry pressure tank, which is closed and a vacuum is applied. Impregnating resin is introduced at from 10° C. to 25° C., and then a pressure of from 40 psi. to 120 psi. is applied for a period of from 2 hours to 6 hours, to force the impregnating resin, which has a low viscosity, into the interstices of the mica in the tangent and slot portions of the coils. At the end of this period the entire length of the mica insulation on the coil is impregnated with resin.

Typical reactive impregnating compositions comprise, for example, bisphenol A epoxy resin; acid anhydride curing agent, such as NADIC methyl anhydride or 1-methyltetrahydrophthalic anhydride; reactive diluent, such as neopentyl diglycidyl ether or vinyl cyclohexanone dioxide; and latent accelerator, such as chromium acetylacetonate, to produce a low viscosity composition of about 80 cps. at 25° C. Such reactive impregnating compositions are well known in the art, and a wide variety are taught, for example, by Smith et al., in U.S. Pat. No. 4,204,181. The impregnating compositions require curing temperatures of from 150° C. to about 175° C.

Figure 2:
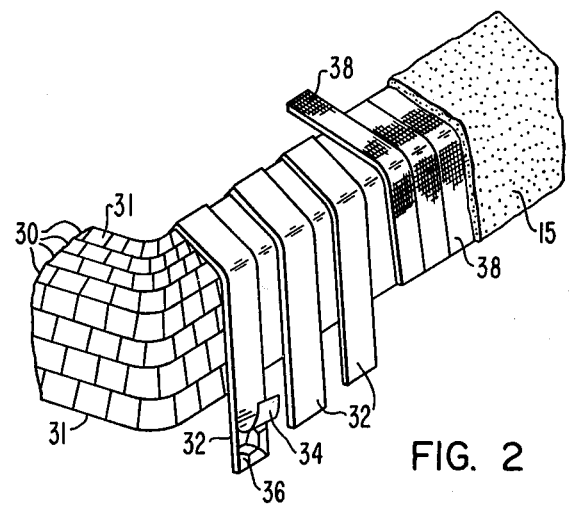
FIG. 2 is a fragmentary view in perspective, showing part of a high voltage coil comprising a plurality of turns of conductors wound with turn insulation and bound together with mica tape as ground insulation, covered with a porous bonding tape and coated in part with a non-linear stress grade coating composition.

In a high voltage A.C. motor or generator, the coil member may comprise a plurality of turns of round or rectangular metallic, electrical conductors, each turn of the conductor consisting essentially of a copper or aluminum strap 30 wrapped with turn insulation 31, as shown in FIG. 2. The turn insulation 31, would be disposed between the conductor straps 30, and a porous layer 32 usually a mica splitting, mica flake or mica paper type, and would generally be prepared from a fibrous sheet or strip impregnated with a resinous insulation.

While the turn insulation may consist solely of a coating of cured varnish or resin, it can also comprise a wrapping of fibrous material treated with a cured resin. Glass fiber or mica paper treated with a cured resin may be used with equally satisfactory results. The resin applied to the turn insulations may be an epoxy resin, a phenolic resin, an alkyd resin, a melamine resin or the like.

The turn insulation is generally not adequate to withstand the severe voltage gradients that will be present between the conductor and ground when the coil is installed in a high voltage motor. Therefore, ground insulation for the coil is provided by porous mica tape 32, which binds the entire coil of electrical conductors together. Preferably, a plurality of layers of composite mica tape 32, which may comprise mica flakes 36 bound with a bonding resin to a flexible material 34, are wrapped about the coil to bind the electrical conductors together. As a substitute for mica flake or mica splitting tape, mica paper comprising very fine particle size mica and a bonding resin can be used with equally outstanding insulating effect.

An exterior tape 38, which is porous, may be wound around the mica tape bound coil. The exterior tape may comprise a porous, open weave substrate of natural or synthetic fabric cloth, for example, cotton, fiberglass or polyethylene terephthalate. The non-linear electrical grading coating of this invention is shown as 15, covering the optional exterior tape 38. The non-linear electrical grading coating, as well as the optional exterior tape and the mica tape or mica paper would continue around the bend in the coil, as shown in FIG. 1.

Figure 3:
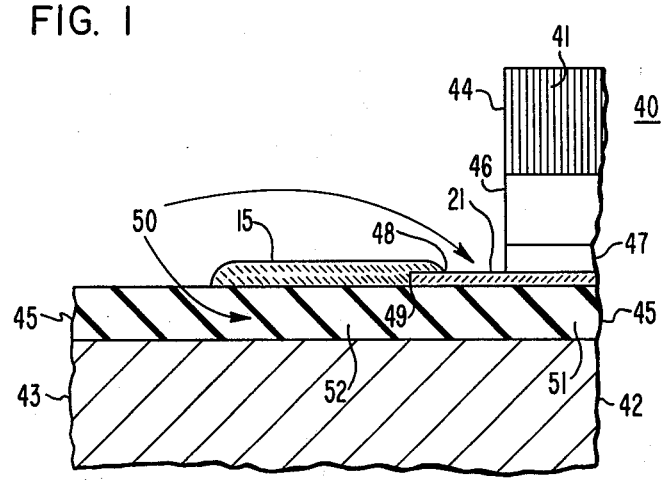
FIG. 3 is a cross-sectional view of a portion of one coil extending outward from the end face of the magnetic core of a stator, showing linear stress grading tape and non-linear stress grading coating.

Referring now to FIG. 3, a portion of an electrical apparatus, such as part of the stator of a dynamoelectric machine, is shown. The stator includes a magnetic core 40, that comprises a plurality of stacked laminations 41. In the portion of the structure shown, the magnetic core is provided with a slot within which are positioned electrical members adapted for high voltage use, such as conductor coil 42. These coils extend out of the slot to provide exterior conductor end coil portions 43, which are shown in a fragmented view, extending outward from the end face 44 of the magnetic core.

A layer of insulation 45 is disposed about the conductor coils 42 both within and outside of the slot. This insulation layer will generally comprise a porous material, preferably mica tape or mica paper bound together with a bonding resin. The insulation, in the case of post impregnation insulating processes, is initially free of V.P.I. impregnating resin. This layer of insulation 45 may also include a porous exterior tape wound around the mica tape or mica paper bound coil, said insulation layer 45 comprising tape 32 and tape 38 shown in FIG. 2. A conventional slot wedge 46 of insulating material, generally cured epoxy or polyester resin impregnated fiberglass, may be provided to secure the coils within the core. A conventional filler strip 47 of insulating material may also be disposed between the coil and the slot wedge.

Linear conducting varnish coating or tape layer 21 is shown covering a portion of the insulation 45 on the slot portion to the coil exterior to the slot, and also within the slot of the magnetic core. This is applied to the coils before insertion into the slots. The linear conducting varnish coating or tape layer 21 extends outwardly about 2 to 8 inches from the end face of the core 44 on the exterior conductor end coil 43.

The non-linear electrical stress grading composition layer 15 is coated onto the coils before insertion into the slots. As shown, the layer of non-linear composition 15 begins close to the end face 44 of the core. It may also begin a greater distance from the core end face as where the exterior conductor end coil begins to bend, not apparent from the drawing. The non-linear grading system layer 15 is generally in contact with, and usually overlaps the exterior portion of the linear conducting varnish coating or tape layer 21, and also covers and contacts a portion of the initially unimpregnated insulation layer 45 covering the exterior conductor 43. The non-linear grading system layer 15 usually starts at a point 48, a distance of from about ½ inch to 3 inches from the end 49 of the linear conducting varnish layer 21.

This layer of non-linear stress grading composition 15 will have a resistivity value, preferably of between about 1,800 Meg. Ohms/Square to 4,000 Meg. Ohms/Square, i.e., Resistivity=V (volts per inch along the conductor)/I (microamp. per inch of exterior insulation perimeter). This is a well known conductive coating term, defined for example in the A. J. Stock article in the 1971 EDN Bulletin referred to hereinbefore. The linear layer 21 will have a thickness of from about 5 mil to 10 mil and the non-linear layer 15 will have a thickness of from about 8 mil to 20 mil. In some instances, multiple coatings of non-linear composition can be used to give a total thickness of up to about 20 mil.

After insertion of the coil, containing the layer's linear and non-linear coatings, into the slots of the electrical apparatus, a prebake at up to about 130° C. for up to about 2½ hours is used, to, in the case of this invention, completely cure the non-linear layer. While only a single coating of linear and non-linear compositions are shown, this is not to be considered limiting, and multiple coatings of each can be used to comprise the linear and non-linear layers 21 and 15 respectively. Additionally, the disposition of the layers 21 and 15 shown in FIG. 3 is meant to be illustrative and not limiting.

After prebake, a low viscosity insulating resin composition is vacuum pressure impregnated into the insulation layer 45, as shown by the direction of the arrows 50, both within the slots under the linear varnish layer, as at point 51, and outside the slot under the non-linear stress grading layer, as at point 52. The impregnating resin will also thinly cover the exterior portions of the linear and non-linear layers, so that impregnating resin intimately contacts both the linear layer 21 and the non-linear stress grading system layer 15.

Once vacuum pressure impregnation is completed, the entire, completely insulated motor or other electrical apparatus is placed in an oven and heated at between about 150° C. and 180° C., to completely cure the impregnating resin. During this hot cure, the various components of the V.P.I. insulating composition, such as the acid anhydride and reactive diluent, are free to aggressively chemically attack the contacting linear and non-linear coatings, especially if the coatings have not been completely cured in the short, low temperature, prebake step. The stress grading coating of this invention is characterized as being substantially resistant to reaction and degradation with the reactive resin.

EXAMPLE 1

A steel plate 3 in. ×6 in. ×0.022 in. was wound with 1, half lapped layer of mica tape and 1, half lapped layer of glass fabric bonding tape. About three quarters of the taped bar was then brushed with approximately a 7 to 10 mil thick coating of non-linear stress grading composition. The non-linear stress grade composition consisted of the admixture of 85 grams of a solid cycloaliphatic epoxy resin of the 3,4-epoxycyclohexyl-3,4-epoxycyclohexane type, having an epoxy equivalent weight of about 370 to 425 and a softening point (ring and ball) of about 85° C. to 113° C. (sold commercially by Union Carbide Corp. under the trade name ERRA-4211); 15 grams of a liquid cycloaliphatic epoxy resin characterized as 3,4 epoxycyclohexylmethyl-3,4-epoxycyclohexane carboxylate, having an epoxy equivalent weight of about 133 and a viscosity of about 350 cps. to 450 cps. at 25° C. (sold commercially by Union Carbide Corp. under the tradename ERL-4221); 6 grams of boron trichloride-amine complex curing agent having a viscosity of about 70 cps. at 30° C.; 360 grams of 400 grit (about 10 to 45 micron) non-linear silicon carbide powder (sold commercially by Excelon Corp. under the tradename Carbotronic GG Silicon Carbide); 124 grams of xylene solvent; and 62 grams of ethyl Cellosolve solvent. This provided a thick brushable, paint-like composition (SiC-Cycloaliphatic Epoxy Sample) which was easily applied to and adhered well to the taped steel plate. The shelf life of the composition was over thirty days at 25° C.

The coated steel plate (Sample 1) was air dried for 16 hours at 25° C., at which time the coating was of a waxy, soft solid consistency. The air dried, coated plate was then placed in an oven for a 2 hour prebake at 115° C. After removal and cooling, the cycloaliphatic epoxy based non-linear stress grade layer was solid and seemed completely cured. The resistivity of the non-linear layer was calculated to be about 2,500 Meg. Ohms/Square. The non-linear stress coated plate was then dipped in a resin bath containing freshly mixed V.P.I. impregnating composition, comprising bisphenol A epoxy resin, acid anhydride curing agent, diglycidyl ether of neopentyl glycol reactive diluent, and latent accelerator (V.P.I. Composition), so that there was complete and intimate contact of the polar, highly reactive impregnating resin composition and the cured non-linear stress grade coating. The impregnating resin was left for 1 hour at 25° C. and then heated up to 150° C. for 1 hour. The coated, impregnated plate was removed from the hot resin bath, and placed in an oven for an 8 hour bake at 160° C. After cooling, the plates were examined. After this severe test, the non-linear stress grade coating was not discolored and exhibited no flaking or attack by the reactive V.P.I. Composition, and remained relatively semi-flexible.

Similarly, other mica-glass taped plates were brushed with approximately 7 to 10 mil thick coatings of non-linear stress grading composition similar to that described above except: Sample 2 contained 5 grams of boron trichloride-amine complex curing agent and used a combination of methyl ethyl ketone and toluene solvent; Sample 3 contained 4 grams of boron trifluoride-amine complex curing agent and used a combination of methyl ethyl ketone and toluene solvent; and Sample 4 contained 2 grams of boron trichloride-amine complex curing agent and used a combination of methyl ethyl ketone and toluene solvent. The Sample 2, 3 and 4 coated steel plates were dried for 16 hours at 25° C. and then placed in an oven for a 2 hour prebake at 130° C. After removal and cooling, the cycloaliphatic epoxy based non-linear stress grading layer seemed completely cured. The coated plates were then dipped in freshly mixed reactive V.P.I. Composition, having the same amounts of ingredients as described above, for 1 hour at 25° C. and 1 hour at 150° C. The coated, impregnated plates were then examined. Samples 2 and 3 exhibited no discoloration, flaking, degradation or attack by the reactive V.P.I. Composition, and remained relatively flexible. Sample 4 exhibited some attack by the reactive V.P.I. Composition, but still showed good adherence, with an acceptable minor loss of some silicon carbide, and no substantial degradation by the reactive resin.

For comparative purposes, the same type of taped steel plates were brushed with approximately a 7 to 10 mil. thick coating of a phenol-formaldehyde based, polyvinyl formal modified, non-linear stress grading composition, containing about 420 grams of 400 grit Carbotronic Silicon Carbide per 100 grams of phenolic solution, and using a mixture of ethanol and toluene solvents (Phenolic-Control Sample).

A Phenolic-Control Sample coated steel plate (Sample 5) was air dried for 16 hours at 25° C. and then placed in an oven for a 2 hour prebake at 115° C. Another Phenolic-Control Sample coated steel plate (Sample 6) was air dried for 16 hours at 25° C. and then placed in an oven for a 2 hour prebake at 130° C, while additional Phenolic-Control Sample coated steel plates were air dried for 16 hours at 25° C. and then placed in an oven for 4 hour and 6 hour prebakes at 130° C. (Samples 7 and 8, respectively).

After removal and cooling, the plates were then dipped in a resin bath containing reactive V.P.I. Composition using the same ingredients as described above in this Example. In all cases, the V.P.I. Composition was left for 1 hour at 25° C. and then heated up to 150° C. for 1 hour. The coated, impregnated plates were removed from the hot resin bath, and placed in an oven for an 8 hour bake at 160° C. After cooling, all the plates were examined. All the phenolic based stress SiC grading coating bubbled and almost completely flaked off, except the coating on the plate that had been cured for 6 hours at 130° C. The other coatings (Samples 5, 6 and 7) appeared to have been completely degraded and severely attacked by the components of the reactive V.P.I. Composition. As can be seen from the Example, only Samples 1 through 4, the coatings of this invention, cured to an acceptable extent during 2 hour prebake, and were resistant to the acid anhydride and reactive diluent components of reactive V.P.I. Compositions for extended periods at 160° C.

As additional comparative examples, a standard bisphenol A epoxy stress grading composition was used. This composition consisted of 100 grams of a solid diglycidyl ether of bisphenol A epoxy, having an epoxy equivalent weight of from 875 to 975 and a Durran's melting point of from 95° C. to 105° C. (sold commercially by Dow Chemical Co. under the tradename Epoxy DER 664); 6 grams of boron trichloride-amine complex curing agent; 360 grams of 400 grit non-linear silicon carbide powder; and a mixture of xylene and methyl ethyl ketone as solvent. This composition was brushed on two of the same type of taped steel plates as described hereinbefore, to a thickness of approximately 7 to 10 mils. The coated plates were then air dried for 16 hours at 25° C., prebaked for 2 hours at 115° C. for one coated plate (Sample 9) and 130° C. for the other coated plate (Sample 10), cooled, dipped in a 25° C. reactive V.P.I. Composition bath, as described above in this Example, for 1 hour, after which the bath temperature was raised to 150° C. for 1 hour, and finally baked in an oven for 8 hours at 160° C. After cooling, the plates were examined. All the standard Sample 9 and 10 bisphenol A epoxy coated plates had been degraded, and major flaking had occurred.

Table 1 below summarizes all of these results:

which extended an additional 3½ inches over the mica wrappings to point 65. The linear conducting carbon tape 21 was overlapped ½ inch on the other side at portion 66 with an approximate 10 mil layer of Phenolic-Control Sample composition 67, as prepared in Example 1, which extended an additional 3½ inches over the mica wrapping to point 68. The coated motor test bar was then placed in an oven and prebaked at 115° C. for 2 hours to cure as much as possible both compositions 15 and 67.

This mica taped, linear and non-linear coated motor test bar was then placed in a dry pressure tank, which was then closed and a vacuum applied. Impregnating V.P.I. Composition, as prepared in Example 1, and containing acid anhydride and reactive diluent, was then introduced at 25° C. and a pressure of 90 psi. was applied for 4 hours, to force the low viscosity, reactive V.P.I. Composition into the interstices of the mica. The pressure was released and the impregnated motor test bar was placed in an oven and baked for 8 hours at 160° C. The impregnation and baking were then exactly repeated. During impregnating and baking, the anhydride and reactive diluent components of the reactive V.P.I. Composition had adequate opportunity to attack both the SiC-Cycloaliphatic Epoxy Sample coating 15 and the Phenolic-Control Sample coating 67 due to intimate contact with both at high temperatures over a

TABLE I

| SAMPLE BASE RESIN | COMPOSITION CURING AGENT PER 100 p. RESIN | CURE PREBAKE | BAKE | REMARKS HOT V.P.I. |
|---|---|---|---|---|
| No. 1: cycloaliphatic epoxy | 6 p. BCl$_3$—amine | 2 hr. 115° C. | 8 hr. 160° C. | no flaking or attack |
| No. 2: cycloaliphatic epoxy | 5 p. BCl$_3$—amine | 2 hr. 130° C. | 8 hr. 160° C. | no flaking or attack |
| No. 3: cycloaliphatic epoxy | 4 p. BF$_3$—amine | 2 hr. 130° C. | 8 hr. 160° C. | no flaking or attack |
| No. 4: cycloaliphatic epoxy | 2 p. BCl$_3$—amine | 2 hr. 130° C. | 8 hr. 160° C. | acceptable minor flaking, some attack |
| No. 5: phenolic-polyvinyl formal* | — | 2 hr. 115° C. | 8 hr. 160° C. | bubbling, almost complete flaking |
| No. 6: phenolic-polyvinyl formal* | — | 2 hr. 130° C. | 8 hr. 160° C. | bubbling, almost complete flaking |
| No. 7: phenolic-polyvinyl formal* | — | 4 hr. 130° C. | 8 hr. 160° C. | bubbling, major flaking |
| No. 8: phenolic-polyvinyl formal* | — | 6 hr. 130° C. | 8 hr. 160° C. | little flaking or attack |
| No. 9: bisphenol A epoxy* | 6 p. BCl$_3$—amine | 2 hr. 115° C. | 8 hr. 160° C. | blistering, rough surface, major flaking |
| No. 10: bisphenol A epoxy* | 6 p. BCl$_3$—amine | 2 hr. 130° C. | 8 hr. 160° C. | blistering, rough surface, major flaking |

*Comparative Samples

EXAMPLE 2

Figure 4:
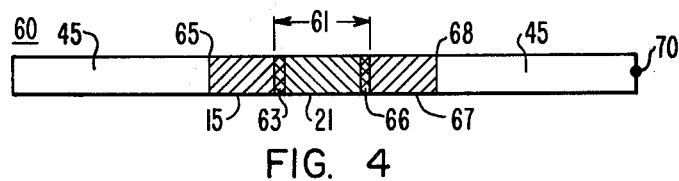
FIG. 4 is a plan view of the motor test bar used for voltage endurance and corona tests in the Examples.

High voltage aging endurance and corona tests were run in a simulated motor environment on SiC-Cycloaliphatic Epoxy Samples and Phenolic-Control Samples made as in Example 1. Referring to FIG. 4 of the Drawings, a steel motor test bar 1½ in. ×18 in. ×0.5 in., designated 60 in FIG. 4, was wound with 10 alternating layers of half lapped mica splitting tape and mica paper tape to form a mica insulation layer 45. At the middle of the wrapped bar, a 4-inch long portion, designated 61 in FIG. 4, was half lap wrapped with an approximate 7 mil layer of linear conducting tape 21, which comprised glass fabric coated with a phenolic-alkyd resin heavily loaded with acetylene carbon black powder. This linear conducting carbon tape 21 was overlapped ½ inch on one side at portion 63 with an approximate 10 mil layer of SiC-Cycloaliphatic Epoxy Sample non-linear stress grading composition 15, as prepared in Example 1, prolonged time period.

The motor test bar was then cooled and a 22 KV., AC., potential was applied to the interior metal of the bar at point 70 for 432 hours. During this time, area 61 acted as ground, simulating conditions within the stator of a motor, and the areas of overlap 63 and 66 and areas of SiC coating 15 and 67 simulated conditions outside of and adjacent to the end face of a magnetic core, such as 44 in FIG. 3. During the test, corona attacked the Phenolic-Control Sample after 216 hours, producing a white attacked band, but corona did not attack the SiC-Cycloaliphatic Epoxy Sample of this invention, whose appearance remained unchanged even after 432 hours. No cracks were produced in either Sample.

In an even more strenuous test, using the same type of mica insulated steel motor test bar, and 7 mil layer of linear conducting tape in the middle 4-inch long portion of the bar, SiC-Cycloaliphatic Epoxy Samples and Phenolic-Control Samples, made as in Example 1, were coated to ½ inch overlap the linear conducting tape and extend an additional 4½ inches from the middle of the bar, as shown in FIG. 4. Thus the Samples were extended 1 inch longer than in the test above. All materials were prebaked, reactive V.P.I. Composition impregnated, and baked as above. The motor test bar was then cooled and a 35 KV. potential was applied to the interior metal of the bar at point 70. After 248 hours, corona had attacked the Phenolic-Control Sample, but, during the same time period corona did not attack the SiC-Cycloaliphatic Epoxy Sample of this invention, whose appearance remained unchanged.

As these tests show, the SiC-Cycloaliphatic Epoxy Sample of this invention exhibits outstanding corona resistance even at a voltage rating above its class, and would be a prime candidate for medium voltage non-linear stress grading coatings for motors and other electrical apparatus. It easily passes the requirements of simplicity, complete cure within a 2½ hour period at less than 130° C., substantial resistance to chemical attack and degradation by components of contacting reactive V.P.I. Composition even at extended periods at 160° C., compatibility with mica and other components of the electrical apparatus, adequate shelf life, and it is relatively inexpensive.

We claim:

1. A method of making an insulated electrical member for high voltage use, said member having in combination, at least an electrical insulation layer disposed about said member, and a non-linear stress grading composition layer covering at least a portion of the electrical insulation layer, said method comprising the steps of:
   (1) disposing a porous layer about a conducting electrical member,
   (2) covering a portion of the porous layer with a non-linear stress grading composition comprising the admixture of:
      (a) cycloaliphatic epoxy resin,
      (b) a Lewis acid complex curing agent for the cycloaliphatic epoxy resin, and
      (c) non-linear silicon carbide powder,
   (4) heating the covered electrical member at up to about 130° C., to completely cure the non-linear stress grading composition,
   (5) impregnating the porous layer with a reactive, highly polar insulating resin composition containing acid anhydride, such that at least the portion of non-linear stress grading composition covering the porous layer is in intimate contact with the reactive, highly polar insulating resin composition, and
   (6) heating the covered, impregnated electrical member at a temperature and for a time effective to cure the reactive, highly polar insulting resin composition; where the non-linear stress grading composition after insulating resin cure is characterized as remaining adherent to the member, with no substantial degradation by the reactive, highly polar resin.

2. The method of claim 1, where the cycloaliphatic epoxy resin consists of a mixture of from about 70 parts by weight to 100 parts by weight of solid cycloaliphatic epoxy resin and from about 0 part to 30 parts by weight of liquid cycloaliphatic epoxy resin, the porous layer covering the conducting member contains mica, the Lewis acid complex is added in an amount up to about 15 parts by weight for each 100 parts of cycloaliphatic epoxy resin, and in step (4) the covered electrical member is heated for up to about 2½ hours.

3. The method of claim 1, where after step (4), the electrical member is placed in the stator slot of an electrical apparatus, and where from about 2 parts by weight to about 15 parts by weight of Lewis acid complex and from about 200 parts by weight to about 800 parts by weight of non-linear silicon carbide powder are used per 100 parts of cycloaliphatic epoxy resin.

4. The method of claim 1, where the Lewis acid complex is selected from the group consisting of boron trichloride-amine complexes, boron trifluoride monoethylamine and boron trifluoride piperidine.

5. An insulated electrical member made by the method of claim 1, where said electrical member is an electrical coil.

6. The insulated electrical member of claim 5, where the Lewis acid complex is selected from the group consisting of boron trichloride-amine complexes, boron trifluoride monoethylamine and boron trifluoride piperidine.

7. A method of making an insulated electrical member for high voltage use, said member having in combination, an electrical insulation layer disposed about said member, a linear conducting varnish layer covering a portion of the insulation layer, and a non-linear stress grading composition layer contacting at least a portion of the linear conducting varnish layer and covering at least a portion of the electrical insulation layer, said method comprising the steps of:
   (1) disposing a porous mica containing layer about a conducting electrical member,
   (2) covering a portion of the mica layer with a layer comprising linear conducting varnish,
   (3) covering a portion of the mica layer and contacting the linear conducting varnish layer with a non-linear stress grading composition consisting essentially of the admixture of:
      (a) 100 parts by weight of cycloaliphatic epoxy resin,
      (b) about 2 parts to about 15 parts by weight of Lewis acid complex curing agent for the cycloaliphatic epoxy resin, and
      (c) about 200 parts to about 800 parts by weight of non-linear silicon carbide powder,
   (4) heating the covered electrical member at up to about 130° C. to completely cure the non-linear stress grading composition,
   (5) impregnating the mica layer with a reactive, highly polar insulating resin composition containing acid anhydride, such that at least the portion of non-linear stress grading composition covering the mica layer is in intimate contact with the reactive, highly polar insulating resin composition containing acid anhydride, and
   (6) heating the covered, impregnated electrical member at over about 130° C. for a time effective to cure the reactive, highly polar insulating resin composition, during which time the acid anhydride is free to chemically attack the non-linear stress grading composition; where the non-linear stress grading composition after insulating resin cure is characterized as remaining adherent to the member, with no substantial degradation by the reactive resin.

8. The method of claim 7, where the cycloaliphatic epoxy resin consists of a mixture of from about 70 parts by weight to 100 parts by weight of solid cycloaliphatic epoxy resin and from about 0 part to 30 parts by weight of liquid cycloaliphatic epoxy resin, and in step (4) the covered electrical member is heated for up to about 2½ hours.

9. The method of claim 7, where after step (4), the electrical member is placed in the stator slot of an electrical apparatus, and where from about 3 parts by weight to about 15 parts by weight of Lewis acid complex is used per 100 parts of cycloaliphatic epoxy resin.

10. An insulated electrical member made by the method of claim 7, where said electrical member is an electrical coil.

11. An insulated electrical member adapted for high voltage use, said member comprising:
   (1) a conducting electrical member,
   (2) a porous layer covering the conducting member, said porous layer having impregnated therein a cured reactive insulating resin, and
   (3) a cured, adherent, non-linear stress grading composition covering a portion of the impregnated porous layer, said non-linear composition comprising the admixture of:
      (a) 100 parts by weight of cycloaliphatic epoxy resin,
      (b) about 2 parts to about 15 parts by weight of a Lewis acid complex curing agent for the cycloaliphatic epoxy resin, and
      (c) about 200 parts to about 800 parts by weight of non-linear silicon carbide powder.

12. The electrical member of claim 11, being an electrical coil, where the porous layer contains mica, and the cycloaliphatic epoxy resin, before cure, consisted of from about 70 parts by weight to 100 parts by weight of solid cycloaliphatic resin and from about 0 part to 30 parts by weight of liquid cycloaliphatic epoxy resin.

* * * * *